(12) United States Patent
Deregibus

(10) Patent No.: US 10,483,732 B2
(45) Date of Patent: Nov. 19, 2019

(54) MULTILAYER CONTAINMENT AND PROTECTION TUBE FOR CONDUITS, CABLES AND THE LIKE

(71) Applicant: TUBIGOMMA DEREGIBUS S.R.L., Saccolongo (IT)

(72) Inventor: Andrea Deregibus, Padua (IT)

(73) Assignee: TUBIGOMMA DEREGIBUS S.R.L., Saccolongo (IT)

( * ) Notice: Subject to any disclaimer, the term of this patent is extended or adjusted under 35 U.S.C. 154(b) by 120 days.

(21) Appl. No.: 15/622,919

(22) Filed: Jun. 14, 2017

(65) Prior Publication Data
US 2017/0365988 A1 Dec. 21, 2017

(30) Foreign Application Priority Data
Jun. 15, 2016 (IT) .................. 102016000061344

(51) Int. Cl.
*F16L 55/00* (2006.01)
*H02G 3/04* (2006.01)
(Continued)

(52) U.S. Cl.
CPC ............ *H02G 3/0481* (2013.01); *B32B 1/08* (2013.01); *B32B 15/02* (2013.01); *B32B 15/08* (2013.01); *B32B 15/082* (2013.01); *B32B 15/085* (2013.01); *B32B 15/14* (2013.01); *B32B 25/00* (2013.01); *B32B 25/02* (2013.01); *B32B 25/08* (2013.01); *B32B 25/16* (2013.01); *B32B 27/00* (2013.01); *B32B 27/12* (2013.01); *B32B 27/18* (2013.01); *B32B 27/20* (2013.01); *B32B 27/304* (2013.01); *B32B 27/32* (2013.01); *B32B 27/322* (2013.01); *B32B 33/00* (2013.01); *F16L 11/081* (2013.01); *F16L 11/085* (2013.01); *F16L 57/02* (2013.01); *F16L 57/06* (2013.01); *B32B 2250/00* (2013.01); *B32B 2250/04* (2013.01); *B32B 2250/05* (2013.01); *B32B 2250/24* (2013.01); *B32B 2264/00* (2013.01);
(Continued)

(58) Field of Classification Search
CPC .... F16L 11/00; F16L 9/14; F16L 55/00; F16L 11/20
USPC .......................... 138/123–127, 137, 140, 141
See application file for complete search history.

(56) References Cited

U.S. PATENT DOCUMENTS 6,807,988 B2 * 10/2004 Powell .................. F16L 11/082
138/125
6,989,198 B2 * 1/2006 Masuda .................... B32B 1/08
138/141
(Continued)

FOREIGN PATENT DOCUMENTS

EP      1306202 A2   5/2003
EP      1450092 A1   8/2004
(Continued)

*Primary Examiner* — Patrick F Brinson
(74) *Attorney, Agent, or Firm* — Cantor Colburn LLP

(57) ABSTRACT

A multilayer containment and protection tube for conduits, cables and the like, includes an inner layer made of polymeric material, which is electrically at least antistatic, with a smooth internal surface, which forms a duct for supporting conduits or cables. The tube further includes one or more intermediate layers of electrically at least antistatic reinforcement, an outer layer made of electrically at least antistatic polymeric material, and a covering and finishing layer, which is electrically at least antistatic.

18 Claims, 1 Drawing Sheet

(51) Int. Cl.
*B32B 1/08* (2006.01)
*B32B 15/08* (2006.01)
*B32B 27/12* (2006.01)
*B32B 27/32* (2006.01)
*F16L 11/08* (2006.01)
*B32B 15/02* (2006.01)
*B32B 15/082* (2006.01)
*B32B 15/085* (2006.01)
*B32B 15/14* (2006.01)
*B32B 25/00* (2006.01)
*B32B 25/02* (2006.01)
*B32B 25/08* (2006.01)
*B32B 25/16* (2006.01)
*B32B 27/00* (2006.01)
*B32B 27/18* (2006.01)
*B32B 27/20* (2006.01)
*B32B 27/30* (2006.01)
*B32B 33/00* (2006.01)
*F16L 57/02* (2006.01)
*F16L 57/06* (2006.01)

(52) U.S. Cl.
CPC ... *B32B 2264/108* (2013.01); *B32B 2307/202* (2013.01); *B32B 2307/206* (2013.01); *B32B 2307/21* (2013.01); *B32B 2307/402* (2013.01); *B32B 2307/406* (2013.01); *B32B 2307/4026* (2013.01); *B32B 2307/538* (2013.01); *B32B 2307/726* (2013.01); *B32B 2307/7265* (2013.01); *B32B 2597/00* (2013.01)

(56) References Cited

U.S. PATENT DOCUMENTS

| | | | |
|---|---|---|---|
| 8,394,471 B2* | 3/2013 | Fisher | F16L 11/127 428/35.7 |
| 2004/0040607 A1* | 3/2004 | Wilson | B32B 1/08 138/137 |
| 2004/0134555 A1* | 7/2004 | Powell | B32B 1/08 138/141 |
| 2008/0041484 A1* | 2/2008 | Haines | B32B 1/08 138/126 |
| 2008/0053597 A1* | 3/2008 | Hatchett | B32B 25/08 156/149 |
| 2010/0126986 A1* | 5/2010 | Gunzing | F16L 11/085 219/643 |
| 2011/0023985 A1* | 2/2011 | Deregibus | F16L 9/121 138/103 |

FOREIGN PATENT DOCUMENTS

| | | |
|---|---|---|
| EP | 1580475 A1 | 9/2005 |
| EP | 2416620 A1 | 2/2012 |

* cited by examiner

MULTILAYER CONTAINMENT AND PROTECTION TUBE FOR CONDUITS, CABLES AND THE LIKE

CROSS-REFERENCE TO RELATED APPLICATIONS

This application is related to and claims the benefit of Italian Patent Application No. 102016000061344, filed on Jun. 15, 2016, the contents of which are herein incorporated by reference in their entirety.

TECHNICAL FIELD

The present disclosure relates to a multilayer containment and protection tube for conduits, cables and the like.

The multilayer tube according to the disclosure is suitable to be used for example in production lines with a high level of automation, particularly in the automotive industry, for the covering and protection of conduits and profiled elements made of plastic material in general, as well as cables or other similar longitudinally extended elements, with which robots and automated mechanical arms that are present in assembly lines are equipped.

In general, such a multilayer tube acts as a flexible protection element in order to protect said conduits and cables from damage and therefore from the risks of a consequent breakage.

These multilayer tubes must be suitable to withstand the frequent stresses that are imparted by the movements of the mechanical arm and the wear of the covering caused by continuous friction with metallic parts, keeping intact the cable/profiled element inserted inside it.

BACKGROUND

Currently, these multilayer tubes are generally constituted by
an inner layer in direct contact with the profiled element or with the cable positioned therein,
one or more intermediate reinforcement layers,
and an outer covering layer.

In general, a robotic mechanical arm, in moving, traces trajectories with very tight radii of curvature; for this reason, a multilayer tube that is installed thereon must be capable of keeping its shape, minimizing its ovalization or in any case limiting it within a certain limit, such as to allow in any situation the sliding of the conduit or of the cable that passes inside it, at the same time preventing its structure from collapsing, damaging the conduit or the cable inside it.

Another important aspect of multilayer tubes for these applications is constituted by the fact that since the conduit or cable is fixed at least at the ends to the robotic arm of which it is a part, the multilayer tube that contains it must allow the conduit or cable to slide freely inside it in order to be able to follow the rapid and repeated movements of the robotic arm.

The movement of the robotic arm causes both the external friction of the multilayer tube with the metallic parts of the mechanical robot with which it is in contact and the internal friction between the conduit or cable arranged inside the multilayer tube and the internal surface of the tube itself.

These friction phenomena generate an accumulation of electrostatic charges, with considerable risk for the safety of the operator and of the apparatus due to possible discharges of electric current and the risk of triggering in the presence of potentially explosive environments.

SUMMARY

The aim of the present disclosure is to provide a multilayer containment and protection tube for conduits, cables and the like that is capable of obviating the cited limitations of conventional multilayer tubes.

Within this aim, the disclosure provides a multilayer tube that prevents the accumulation of charges on the tube itself.

The present disclosure further provides a multilayer tube that is capable of reducing the friction phenomena that are typical of multilayer tubes of the known type.

The present disclosure also provides a multilayer tube that is no less mechanically strong, flexible and resistant than tubes of the known type.

These features and advantages are achieved by providing a multilayer containment and protection tube for conduits, cables and the like comprising an inner layer made of polymeric material, which is electrically at least antistatic, with a smooth internal surface, which forms a duct for supporting conduits or cables; one or more intermediate layers of electrically at least antistatic reinforcement, an outer layer made of electrically at least antistatic polymeric material, and a covering and finishing layer, which is electrically at least antistatic.

BRIEF DESCRIPTION OF THE DRAWINGS

Further characteristics and advantages of the disclosure will become better apparent from the description of two preferred but not exclusive embodiments of the multilayer tube according to the disclosure, illustrated by way of non-limiting example in the accompanying drawings, wherein.

DETAILED DESCRIPTION OF THE DRAWINGS

Figure 1:
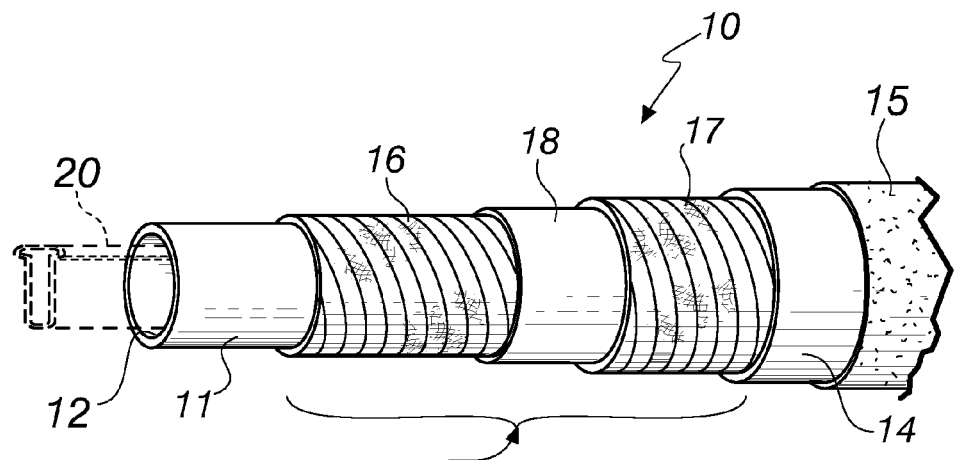
FIG. 1 is a schematic perspective view of a tube according to the disclosure in a first embodiment thereof without a reinforcement spiral.

With reference to the figures, a multilayer tube according to the disclosure is designated, in the entirety of a first embodiment thereof, by the reference numeral 10.

The multilayer tube 10 is characterized in that it comprises
an inner layer 11 made of polymeric material, which is electrically at least antistatic, with a smooth internal surface 12, which forms a duct for supporting conduits or cables; FIG. 1 shows schematically, by way of example, in dashes a conduit 20;
one or more intermediate layers 13 of electrically at least antistatic reinforcement,
an outer layer 14 made of electrically at least antistatic polymeric material,
a covering and finishing layer 15, which is electrically at least antistatic.

The inner layer 11, made of polymeric material, is made of a fluorinated polymer chosen among FEP, MFA, PFA, ECTFE, PVDF, and PTFE.

The inner layer 11 is preferably and advantageously made of polytetrafluoroethylene PTFE.

PTFE in fact notoriously has the characteristic of an extremely low static and dynamic friction coefficient, therefore at the smooth internal surface 12 of the inner layer 11, the value of which is approximately 0.02; this value of the static and dynamic friction coefficient allows the internal surface 12 of the inner layer 11 to have a very low adhesion and to be self-lubricating.

This particularity facilitates the sliding of the conduit 20, or of a cable or of another longitudinal element, inside the multilayer tube 10, preserving the conduit or cable from abrasion and wear.

Furthermore, the low friction coefficient ensures a certain degree of self-cleaning, avoiding the forming of deposits within the multilayer tube 10.

This particularity of exceptional lubricity that is typical of polytetrafluoroethylene also facilitates maintenance operations if the need arises to remove the conduit or cable or other profiled element from the inside of the multilayer tube 10.

Maintenance in fact entails the extraction and subsequent re-insertion of the profiled element inside the tube; the exceptional lubricity of the internal surface 12 of the inner layer 11 made of PTFE allows to extract and reinsert effortlessly the conduit 20 or other cable or profiled element from the inside of the multilayer tube 10 without generating friction and preserving the conduit 20 or other cable or profile from abrasion.

This particular property of the inner layer 11 made of polytetrafluoroethylene also allows to reduce maintenance times considerably, since it is possible to replace and/or maintain the conduit 20 or other cable or profiled element, by extracting it and reinserting it in the tube without having to remove the multilayer tube 10 from its installation position on the mechanical arm.

The inner layer 11 made of PTFE fluoropolymer is also capable of ensuring exceptional resistance to flexing and vibrations, which are a very onerous aspect of the exemplified application to robotic aims.

In particular, the resistance to flexing and vibrations of PTFE is greater than that of all other commercially available fluoropolymers, and accordingly the inner layer 11 made of PTFE ensures a resistance to folding cycles (folding endurance ASTM D 2176) that is approximately two orders of magnitude greater than that of the other fluoropolymers (FEP, MFA, PFA, ECTFE, and PVDF).

Another inherent characteristic of the PTFE material is substantial non-flammability, which reduces the risk of triggering, increasing significantly the safety of the multilayer tube 10 according to the disclosure.

In particular, the inner layer 11 made of PTFE fluoropolymer is conducting and therefore acts as a medium for the discharge of the electrostatic charges that might accumulate during friction of the conduit 20 or cable or other profiled element in contact with the inner layer 11.

Therefore, the useful life and the performance of the multilayer tube 10 with at least one inner layer 11 and made of PTFE fluoropolymer are greater than those of other tubes and the maximum ones currently commercially attainable.

It should be understood that the thickness of the inner layer 11 made of PTFE fluoropolymer can be of variable size according to the requirements of use (flexibility) or the choices of the manufacturer.

As an alternative, the inner layer 11 made of polymeric material is made of thermoplastic polymer.

For example, the inner layer 11 is made of ultra high molecular weight thermoplastic polymer, also known by the English acronym UHMWPE.

Advantageously, the inner layer 11 is a continuous tubular extruded element; by virtue of its provision by extrusion, an internal surface 12 is obtained without joining lines between parts, since the inner layer 11 is a single continuous part.

The inner layer 11 is preferably electrically conducting.

In this first embodiment, the one or more intermediate reinforcement layers 13 comprise at least one textile or metallic reinforcement layer 16, for example a metallic braid.

In particular, the one or more intermediate reinforcement layers 13 comprise two textile or metallic reinforcement layers 16, 17.

A filler layer made of elastomeric material 18, for example EPDM, which is at least antistatic and preferably conducting, is interposed between the two textile or metallic reinforcement layers 16, 17.

The outer layer 14 made of polymeric material is made of elastomeric material and is made for example of EPDM.

The outer layer 14 is electrically conducting.

The covering and finishing layer 15 is made of thermoplastic material.

The thermoplastic material of the covering and finishing layer 15 is for example polyethylene.

In particular, and preferably, said thermoplastic material of the covering and finishing layer 15 is ultra high molecular weight polyethylene UHMWPE.

The covering and finishing layer 15 made of thermoplastic UHMWPE is electrically conducting.

Also in particular, the covering and finishing layer 15 made of UHMWPE is completely black.

As an alternative, the covering and finishing layer 15 made of UHMWPE is constituted by a matrix with a white or whitish coloring which is provided with uniformly dispersed electrically conducting bridges.

As a further alternative, the covering and finishing layer 15 made of UHMWPE is marbled, with a carbon filler which gives it a substantially dark color.

Advantageously, the covering and finishing layer 15 has a substantially smooth and glossy external surface.

The substantially smooth and glossy external surface allows the multilayer tube 10 to have a distinct tendency to remain clean and also to be easy to clean, contrasting the adhesion thereon of the dust or dirt with which it can come into contact.

Furthermore, by virtue of the smooth outer surface of the covering layer 15, the multilayer tube 10 slides easily, being easy to install and move.

As an alternative, it is possible to decide to use an outer covering and finishing layer 15 that is not glossy, bearing in mind however that in this case the tube will not have the specific advantages that derive from the smooth and glossy external surface finish.

A multilayer tube according to the disclosure also has an assurance of electrical dissipation of electrostatic charges by virtue of the conducting or antistatic covering.

The thermoplastic material of the covering and finishing layer 15 can be constituted by different materials, with different colorings, so long as they are electrically conducting or antistatic in order to allow dissipation of the electrostatic charges that can accumulate on the surface due to friction during use of the tube.

Figure 2:
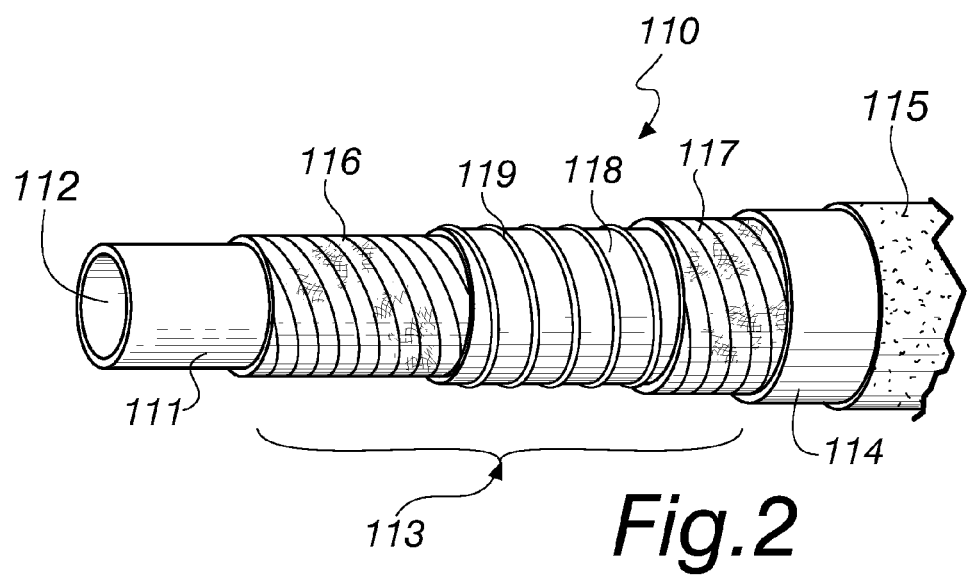
FIG. 2 is a schematic perspective view of a tube according to the disclosure in a second embodiment thereof with a reinforcement spiral.

In a second embodiment, shown schematically in FIG. 2, the multilayer tube according to the disclosure, designated therein by the reference numeral 110, is characterized in that it comprises, in a manner similar to what has been described above for the first embodiment 10, an inner layer 111 made of polymeric material, which is electrically at least antistatic, with a smooth internal surface 112, which forms a duct for supporting conduits or cables;

one or more intermediate layers 113 of electrically at least antistatic reinforcement, an outer layer 114 made of electrically at least antistatic polymeric material, a covering and finishing layer 115, which is electrically at least antistatic.

In this second embodiment, the one or more intermediate reinforcement layers 113 comprise a reinforcement spiral 119.

The reinforcement spiral 119 is made of metallic material.

As an alternative, the reinforcement spiral 119 is made of thermoplastic material.

The reinforcement spiral 119 is wound in said tube with an inclination and a pitch that depend on the requirements of application and production.

In this exemplary embodiment, the spiral 119 is arranged between two layers of textile or metallic reinforcement 116 and 117, together with an interposed filler layer made of elastomeric material 118.

The arrangement and the number of spirals can vary and depend on the production technology and on the type of characteristics sought.

The choice to use a reinforcement spiral increases the performance of the multilayer tube 110, since it allows the tube to maintain its shape without ovalizing beyond a certain limit, such as to allow the sliding of the conduit or cable or other profiled element arranged inside it.

In the specific example of application cited above, if the movements of a mechanical arm trace curvatures with a very tight radius, the metallic spiral 119 prevents the collapse of the tube, allowing the sliding of the conduit that is arranged inside it and avoiding its damage.

The choice of the material, the arrangement and the number of spirals depend on the manufacturer and of the type of performance that is required of the tube.

In practice it has been found that the disclosure achieves the intended aim and objects.

In fact, the disclosure provides a multilayer tube that prevents the accumulation of charges on said tube, by virtue of the inner, intermediate, outer and covering layers, all of which are at least antistatic, and in particular with the conducting inner and outer layers; said multilayer tube according to the disclosure acts as a means for discharging the electrostatic charges that might accumulate thereon.

Moreover, the disclosure provides a multilayer tube that is capable of reducing the friction phenomena that are typical of multilayer tubes of the known type, in particular by virtue of the inner layer with a smooth internal surface, and in particular by virtue of an inner layer made of PTFE, which has an extremely low static and dynamic friction coefficient.

Moreover, the disclosure provides a multilayer tube that is no less mechanically strong, flexible and resistant than tubes of the known type.

The disclosure thus conceived is susceptible of numerous modifications and variations, all of which are within the scope of the appended claims; all the details may further be replaced with other technically equivalent elements.

In practice, the components and materials used, so long as they are compatible with the specific use, as well as the contingent shapes and dimensions, may be any according to the requirements and the state of the art.

What is claimed is:

1. A multilayer containment and protection tube for conduits, cables and the like, comprising
an inner layer made of polytetrafluoroethylene PTFE, which is electrically at least antistatic, with a smooth internal surface, which forms a duct for supporting conduits or cables,
one or more intermediate layers of electrically at least antistatic reinforcement,
an outer layer made of electrically at least antistatic polymeric material, and
a covering and finishing layer, which is electrically at least antistatic, wherein said covering and finishing layer is made of thermoplastic material, wherein said thermoplastic material of said covering and finishing layer is ultrahigh molecular weight polyethylene UHMWPE, and wherein said covering and finishing layer has a substantially smooth and glossy external surface.

2. The multilayer tube according to claim 1, wherein said inner layer made of polymeric material is made of a fluorinated polymer selected among FEP, MFA, PFA, ECTFE, PVDF and PTFE.

3. The multilayer tube according to claim 1, wherein said inner layer made of polymeric material is made of thermoplastic polymer.

4. The multilayer tube according to claim 1, wherein said inner layer is made of ultrahigh molecular weight thermoplastic polymer UHMWPE.

5. The multilayer tube according to claim 1, wherein said inner layer is a continuous extruded tubular element.

6. The multilayer tube according to claim 1, wherein said inner layer is electrically conducting.

7. The multilayer tube according to claim 1, wherein said one or more intermediate reinforcement layers comprise at least one textile or metallic reinforcement layer.

8. The multilayer tube according to claim 1, wherein said one or more intermediate reinforcement layers comprise two textile or metallic reinforcement layers.

9. The multilayer tube according to claim 8, wherein a filler layer made of elastomeric material is interposed between said two textile or metallic reinforcement layers.

10. The multilayer tube according to claim 1, wherein said one or more intermediate reinforcement layers comprise a reinforcement spiral.

11. The multilayer tube according to claim 10, wherein said reinforcement spiral is made of metallic material.

12. The multilayer tube according to claim 10, wherein said reinforcement spiral is made of thermoplastic material.

13. The multilayer tube according to claim 1, wherein said outer layer is electrically conducting.

14. The multilayer tube according to claim 1, wherein said thermoplastic material of said covering and finishing layer is polyethylene.

15. The multilayer tube according to claim 1, wherein said covering and finishing layer made of thermoplastic UHMWPE is electrically conducting.

16. The multilayer tube according to claim 1, wherein said covering and finishing layer made of UHMWPE is completely black.

17. The multilayer tube according to claim 1, wherein said covering and finishing layer made of UHMWPE is constituted by a matrix provided with uniformly dispersed electrically conducting bridges.

18. The multilayer tube according to claim 1, wherein said covering and finishing layer made of UHMWPE is marbled, with a carbon filler that gives it a substantially dark color.

* * * * *